United States Patent [19]
Ishiwatari

[11] Patent Number: 5,574,719
[45] Date of Patent: Nov. 12, 1996

[54] TRANSMISSION SYSTEM

[75] Inventor: Junichi Ishiwatari, Kawasaki, Japan

[73] Assignee: Fujitsu Limited, Kanagawa, Japan

[21] Appl. No.: 328,065

[22] Filed: Oct. 24, 1994

[30] Foreign Application Priority Data

Mar. 18, 1994 [JP] Japan .................................. 6-049609

[51] Int. Cl.⁶ ...................................................... H04L 1/22
[52] U.S. Cl. ............................................ 370/16; 370/16.1
[58] Field of Search ................................... 370/110.1, 14, 370/15, 16, 16.1, 112; 340/897, 825.01; 455/8, 9; 395/180, 181

[56] References Cited

U.S. PATENT DOCUMENTS

| | | | |
|---|---|---|---|
| 4,506,357 | 3/1985 | Nakayashiki et al. | 370/16 |
| 4,553,233 | 11/1985 | Debuysscher et al. | 370/16 |
| 4,648,088 | 3/1987 | Cagle et al. | 370/16 |
| 4,835,763 | 5/1989 | Lau | 370/16 |
| 4,855,993 | 8/1989 | Hamuda et al. | 370/16 |
| 5,150,356 | 9/1992 | Tsutsui | 370/16.1 |
| 5,159,595 | 10/1992 | Flanagan et al. | 370/16 |
| 5,241,534 | 8/1993 | Omuro et al. | 370/16 |
| 5,265,096 | 11/1993 | Parruck | 370/110.1 |
| 5,278,824 | 1/1994 | Kremer | 370/15 |
| 5,282,200 | 1/1994 | Dempsey et al. | 370/85.12 |
| 5,307,353 | 4/1994 | Yamashita et al. | 370/15 |
| 5,329,520 | 7/1994 | Richardson | 370/16 |
| 5,406,401 | 4/1995 | Koemer | 370/16 |

OTHER PUBLICATIONS

"Sonet Add-Drop Multiplex Equipment (Sonet ADM) Generic Criteria: An Undirectional, Dual-Fed, Path Protection Switched, Self-Heading Ring Implementation", Technical Reference TR-TSY-000496, Bell Core, Issue 2, Sep. 1989, Supplement 1, Sep. 1991.

"Synchronous Optical Network (Sonet) Transport Systems: Common Generic Criteria: A Module of TSGR, FR-NWT000440", Technical Reference TR-NNT-000253, Bellcore Issue 2, Dec. 1991.

*Primary Examiner*—Douglas W. Olms
*Assistant Examiner*—Ajit Patel

[57] ABSTRACT

A wait-to-restore section corresponding to a first channel has a selector for switching an output side under the control of a mode setting section, and a timer which is reset at the time of mode change. The selector of the wait-to-restore section corresponding to the first channel supplies its output only to a path switch corresponding to the first channel in STS-1 mode and commonly supplies the output to path switches corresponding to the first to third channels. The mode setting section supplies selector change signals to respective alarm detecting sections corresponding to the first to third channels, and supplies a selector change signal and a timer reset signal to the selector of the wait-to-restore section corresponding to the first channel. At the time of mode change from the STS-1 mode to the STS-3c mode or vice versa, the timer of the wait-to-restore section corresponding to the first channel is reset. In STS-3c mode, timers of the wait-to-restore sections corresponding to the second and third channels exclusive for the STS-1 mode are reset.

9 Claims, 9 Drawing Sheets

| PRIOR ART/PRESENT INVENTION | WTR SECTION | | | | P-SW COUNTER SECTION | | | | ALARM DISPLAY SECTION | | | |
|---|---|---|---|---|---|---|---|---|---|---|---|---|
| CHANNEL | 1 | 2 | 3 | 3c | 1 | 2 | 3 | 3c | 1 | 2 | 3 | 3c |
| REFERENCE CODE | 4 | 5 | 6 | 20 | 12 | 13 | 14 | 15 | 16 | 17 | 18 | 19 |
| STS-1 MODE | O/O | O/O | O/O | R/- | O/O | O/O | O/O | R/- | O/O | O/O | O/O | R/- |
| CHANGED FROM STS-1 MODE TO STS-3c MODE | -/R | -/- | -/- | -/- | -/R | -/- | -/- | -/- | -/R | -/- | -/- | -/- |
| STS-3c MODE | R/O | R/R | R/R | O/- | R/O | R/R | R/R | O/- | R/O | R/R | R/R | O/- |
| CHANGED FROM STS-3c MODE TO STS-1 MODE | -/R | -/- | -/- | -/- | -/R | -/- | -/- | -/- | -/R | -/- | -/- | -/- |

FIG. 7
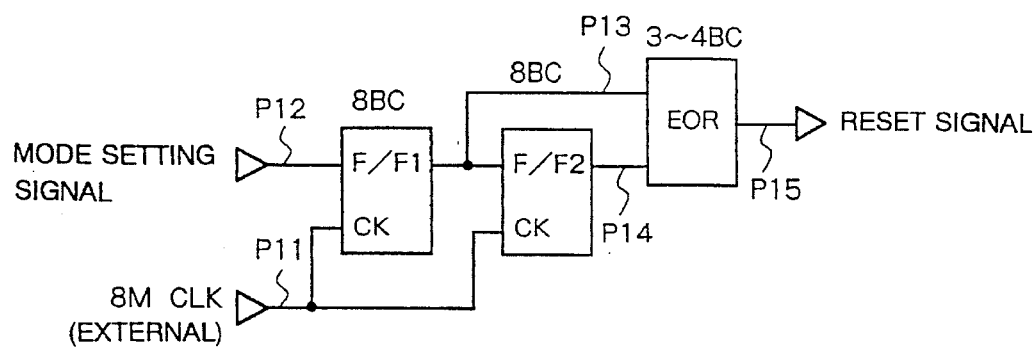
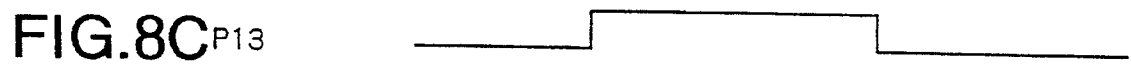
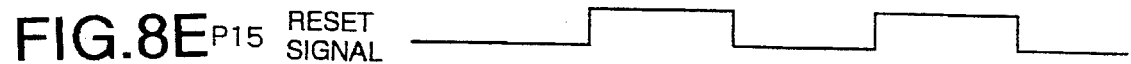

STS-1 FRAME

STS-3c FRAME

TRANSMISSION SYSTEM

BACKGROUND OF THE INVENTION

1. Field of the Invention

The present invention relates to an optical transmission system which constitutes a node or a network element of a ting network that conforms to the SONET (Synchronous Optical Network) system, and more particulary, to an optical transmission system which includes a path switch (P-SW) for selectively outputting signals coming from two directions and copes with both the STS-1 (Synchrinous Transport Signal-level 1) mode STS-3c (Synchronous Transport Signal-level 3 concatenation) mode.

2. Description of the Related Art

Due to the recent progression of the information society, there are demands for multifarious targets of information communications (i.e., multi-media of voices, images and data), a larger communication traffic capacity and a wider communications area. To meet those demands, the international standardization of the communications interface has been established mainly by. for example, ITU-T (International Telecommunication Union-Telecommunication Standardization Sector), former CCITT (Comité Consultatif International Télégraphique et Téléphonique). Proposed as one of such standard systems is the SONET system standardized in North America with the United States as the center. For example, FLM (Fiber Looped Multiplexer) 150/600/2400 ADM (Add-Drop Multiplexer) apparatuses have been designed and developed as the optical transmission system which conforms to the SONET standards.

In a ring network system which conforms to the SONET standards, an optical transmission system constituting a network element receives, for example, an STS-1 signal and an STS-3c signal, both conforming to the SONET standards, from paths in two directions (e.g., east (E) and west (W)), and selectively outputs the signal from either the eastward path or the westward path the through a path switch. Hereinafter, the eastward path and westward path will be called "E path" and "W path," respectively.

To realize the path switching operation of an optical transmission system such as the aforementioned FLM 150/600/2400 ADM equipment, it is necessary to execute the wait-to-restore (WTR) process after detection of an alarm in signals in the aforementioned two directions, count the number of path switching operations and provide an alarm display based on the result of the alarm detection. With regard to the WTR process, particularly, "SONET Add-Drop Multiplex Equipment (SONET ADM) Generic Criteria" (TR-TSY-000496, Issue 2), one of the technical references for the SONET standards, originally proposed by Bellcore (Bell Communications Research), defines the following as a requirement.

"The revertive path switching algorithm shall use a hysteresis method to prevent unwanted oscillations between service and protection paths. A provisionable wait-to-restore time of 0–12 minutes shall be provided before allowing restoration."

The service and protection paths are respectively a path of the current use and a spare path, which are assigned to the aforementioned E path and W path.

The conventional optical transmission system includes a wait-to-restore circuit for the WTR process, a P-SW (path switch) counter for counting the number of path switching operations and an alarm display circuit for displaying alarm information separately for each of the STS-1 mode and STS-3c mode.

FIG. 1 shows one example of the principle structure of the thus structured optical transmission system.

For STS-1 Mode

In STS-1 mode, input to the input terminals from the E paths and W paths of the first channel (CH1), second channel (CH2) and third channel (CH3) are signals having the STS-1 frame format (signals of 51.84 Mb/s×3 channels). Hereinafter, the "first channel," "second channel," "third channel" and "n-th channel" will be simply called "CH1," "CH2," "CH3" and "CHn," respectively, for the sake of descriptive convenience. First, second and third alarm detecting sections 1, 2 and 3 detect an alarm in signals in the STS-1 frame in the individual channels. A mode setting section 11 for setting the STS-1 mode or STS-3c mode allows selectors SEL in the alarm detecting sections 1, 2 and 3 to give the detection results to first, second and third wait-to-restore (WTR) sections 4, 5 and 6, respectively. The WTR sections 4, 5 and 6 do not immediately enable first, second and third path switches 7, 8 and 9 even if an alarm is removed, but hold the first to third path switches 7–9 to the alarm-detected side only for a set time (wait-to-restore time) between 0 to 12 minutes and set the path switches 7–9 to the default side (initialized side) after the WTR time has passed.

In FIG. 2, for alarms on the E path side and W path side, "0" is when there is no alarm and "1" indicates the presence of an alarm, and the WTR time set in the WTR sections 4, 5 and 6 is 10 minutes.

When an alarm is generated on the default side or the E path side at an interval of 4 minutes or 2 minutes, shorter than the set time interval of 10 minutes, the WTR sections 4, 5 and 6 operate as if an alarm is continuously generated although the actual alarm has been removed from the signal. When an alarm is detected again within the WTR time, the timers in the WTR sections 4, 5 and 6 are reset every time. When an alarm is removed again, the timers in the WTR sections 4, 5 and 6 start from 0 minute. When 10 minutes passes after the removal of the alarm for both the E and W paths, the path switches 7, 8 and 9 are set to the E path side or the default side. At the same time, the timers of the WTR sections 4, 5 and 6 are reset.

In this case, as the mode is the STS-1 mode, the selector SEL in the path switch 7 is set by the mode setting section 11 to supply a count signal representing the number of times the path switch 7 has operated to a P-SW counter section 12. Therefore, the numbers of the switching actions of the path switches 7, 8 and 9 are counted by first, second and third P-SW counter sections 12, 13 and 14, respectively. Alarms given to the WTR sections 4, 5 and 6 from the respective alarm detecting sections 1, 2 and 3 are likewise supplied to first, second and third alarm display sections 16, 17 and 18 to be displayed.

For STS-3c Mode

In STS-3c mode, a signal of 155.52 Mb/s, which is the ST-3c frame format demultiplexed by ⅓ is input to the E and W paths of each of the CH1, CH2 and CH3.

Since the STS-3c frame has a single frame format, when an alarm is detected by any one of the alarm detecting sections 1, 2 and 3, the path switches 7, 8 and 9 should be changed over in responsive to the actions of the alarm detecting sections 1–3. The mode setting section 11 sets the selectors SEL in the alarm detecting sections 1–3 so as to supply the detection results of the alarm detecting sections 1–3 to an OR gate 10. Under this situation, the alarm detecting sections 1–3 perform detection of an alarm in the signals in the STS-3c frame and provide a fourth WTR section 20 for the STS-3c mode with the detection results.

The WTR section 20 functions in nearly the same manner as in the STS-1 mode to enable the path switches 7, 8 and 9 in an interlocked fashion. In this case, the mode setting section 11 sets the selector SEL in the path switch 7 to send the count signal indicating the number of switching actions to a fourth P-SW counter section 15 for the STS-3c mode. Accordingly, the numbers of the switching actions of the path switches 7, 8 and 9 are counted by the P-SW counter section 15. An alarm given to the fourth WTR section 20 for the STS-3c mode is simultaneously supplied to a fourth alarm display section 19 for the STS-3c mode to be displayed.

As described above, the exclusive circuits for the STS-3c mode, namely, the timer in the WTR section 20, the counter in the P-SW counter section 15 and the display value of the alarm display section 19, are always reset in STS-1 mode. In STS-3c mode, on the other hand, the exclusive circuits for the STS-1 mode, namely, the timers in the WTR sections 4, 5 and 6, the counters in the P-SW counter sections 12, 13 and 14, and the display values of the alarm display sections 16, 17 7 and 18, are always reset.

In the conventional optical transmission system shown in FIG. 1, the WTR sections 4, 5, 6 and 20, the P-SW counter sections 12, 13, 14 and 15 and the alarm display sections 16, 17, 18 and 19 are provided for each of the STS-1 mode and STS-3c mode, resulting in a large circuit structure.

While the structure shown in FIG. 1 is premised on the case where signals of 155.52 Mb/s are handled, "Synchronous Optical network (SONET) Transport Systems: Common Generic Criteria" (TR-NWT-000253, Issue 2), another technical reference for the SONET standards proposed by Bellcore, defines the relation between the line rate or traffic capacity and the signal level as shown in Table 1 below. That is, Table 1 shows the relation among the OC level, the STS level and the line rate in SONET.

TABLE 1

| OC Level (optical signal) | STS Level (electric signal) | Line Rate (Mb/s) |
| --- | --- | --- |
| OC-1 | STS-1 | 51.840 |
| OC-3 | STS-1 × 3 or STS-3c | 155.520 |
| OC-9 | STS-1 × 9 or STS-9c | 466.560 |
| OC-12 | STS-1 × 12 or STS-12c | 622.080 |
| OC-18 | STS-1 × 18 or STS-18c | 933.120 |
| OC-24 | STS-1 × 24 or STS-24c | 1244.160 |
| OC-36 | STS-1 × 36 or STS-36c | 1866.240 |
| OC-48 | STS-1 × 48 or STS-48c | 2488.320 |

It is apparent from Table 1 that as the traffic capacity increases, the circuit scale increases so that to accomplish the optical transmission of 155.52 Mb/s or greater, a large-scaled circuit is inevitably needed. The "OC-3" in Table 1 is the level of an optical signal, which is equivalent to the level of the STS1 of an electric signal multiplexed by 3 or the level of the STS-3c.

To accomplish the optical transmission of 2488.32 Mb/s, therefore, the circuit of 16 times the scale of the circuit in FIG. 1 is required to process STS-1 signals and STS-48c signals for CH1 to CH48. As the traffic capacity increases, it is necessary to further reduce the circuit scale.

SUMMARY OF THE INVENTION

It is therefore an object of the present invention to provide an optical transmission system in a SONET system, whose circuit scale can effectively be reduced without the sacrifice of its functions to systemize the circuit structure.

An optical transmission system according to the present invention effectively shares a WTR section in both the STS-1 mode and STS-3c mode to reduce the circuit scale.

According to the optical transmission system of the present invention, effectively shares the WTR section corresponding to CH1 in STS-1 mode is shared in both the STS-1 mode and STS-3c mode. Accordingly, a mode setting section and a path switch slightly differ from those of the conventional system.

The WTR section has a selector for switching an output side under the control of the mode setting section, and is designed in such a way that a timer is reset at the time the mode is changed. More specifically, the selector of the WTR section supplies the output only to the path switch for CH1 in STS-1 mode, and supplies the output commonly to the path switches for CH1 to CH3 in STS-3c mode.

The mode setting section supplies a selector switch signal to alarm detecting sections for CH1 to CH3 and supplies a select switch signal and a timer reset signal to the WTR section for CH1.

This optical transmission system differs from the conventional system in STS-1 and STS-3c modes in that the output of the WTR section for CH1 is supplied only to the path switch for CH1 in STS-1 mode while this output is supplied to all the path switches for CH1 to CH3 in STS-3c mode. This is because that it is necessary to control the interlocked action of the path switches for CH1 to CH3 in STS-3c mode.

In this case, at the time of changing the STS-1 mode to the STS-3c mode or changing the STS-3c mode to the STS-1 mode, the wait-to-restore time in the previous mode remains in the timer of the WTR section for CH1. To prevent a time after the mode change from being added to the remaining time, therefore, the timer of the WTR section for CH1 should be reset. In STS-3c mode, the timers of the WTR sections for CH2 and CH3 for the exclusive use for the STS-1 mode are reset.

Since the above-described structure, unlike the conventional system structure, shares the WTR section for CH1 in both the STS-1 mode and STS-3c mode, no exclusive WTR sections for the STS-3c mode are required but the selector in the WTR section for CH1 and the timer reset output of the mode setting section are added. The circuit scale for the added components is considerably smaller than the circuit scale that is omitted.

The optical transmission system of this invention may be modified so that at least one of the P-SW counter section and alarm display section is effectively shared in the STS-1 mode and STS-3c mode.

In this case, the P-SW counter section shared in the STS-1 mode and STS-3c mode counts the count value of the associated path switch (e.g., for CH1) regardless of the mode.

The alarm display section shared in the STS-1 mode and STS-3c mode displays an alarm based on the detection result of the associated alarm detecting section in STS-1 mode and displays an alarm based on the OR gate, which performs an OR operation on the outputs of all the alarm detecting sections, in STS-3c mode.

In those cases, at the time of changing the STS-1 mode to the STS-3c mode or changing the STS-3c mode to the STS-1 mode, the count value of the path switch or the alarm display value in the previous mode remains in the shared P-SW counter section or the shared alarm display section. To prevent a value in the new mode from being added to the remaining value, therefore, the counter of the P-SW counter section or the display value of the alarm display section are reset. In STS-3c mode, the counters of the exclusive P-SW counter sections for the STS-1 mode or the display values of the exclusive alarm display sections for the STS-1 mode are reset.

According to the optical transmission system embodying this invention, as the WTR section, or the WTR section and at least one of the P-SW counter section and alarm display section are shared effectively, the circuit scale can effectively be reduced without the sacrifice of its functions to systemize the circuit structure.

BRIEF DESCRIPTION OF THE DRAWINGS

FIG. 7 is a block diagram showing the structure of a reset signal generator in the system in FIG. 4;

FIG. 8 is a timing chart illustrating the operation of the reset signal generator in the system in FIG. 4;

DETAILED DESCRIPTION OF THE PREFERRED EMBODIMENTS

Optical transmission systems according to specific embodiments of the present invention will now be described referring to the accompanying drawings.

First Embodiment

Figure 1:
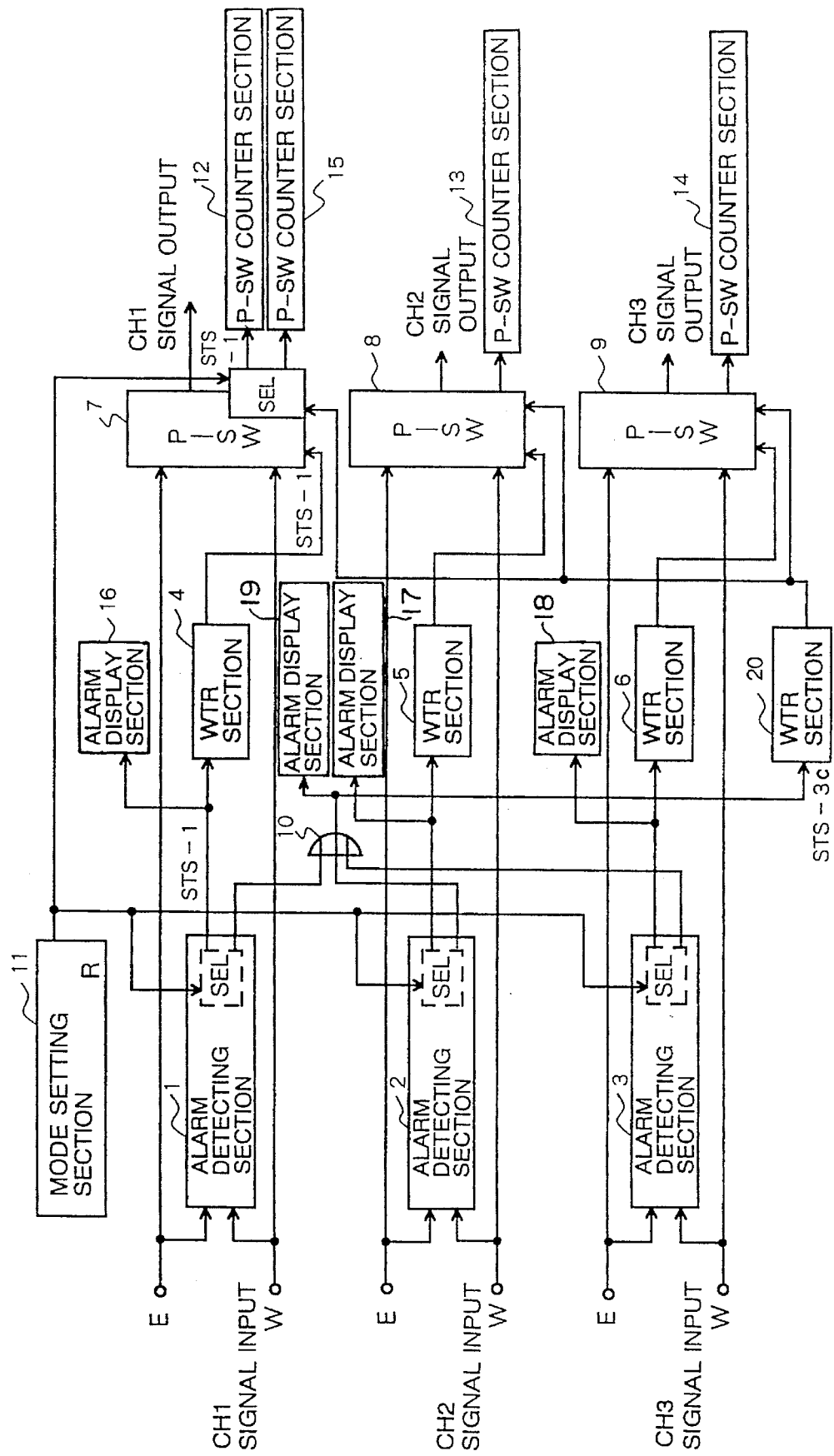
FIG. 1 is a block diagram illustrating the structure of a conventional optical transmission system.
Figure 2:
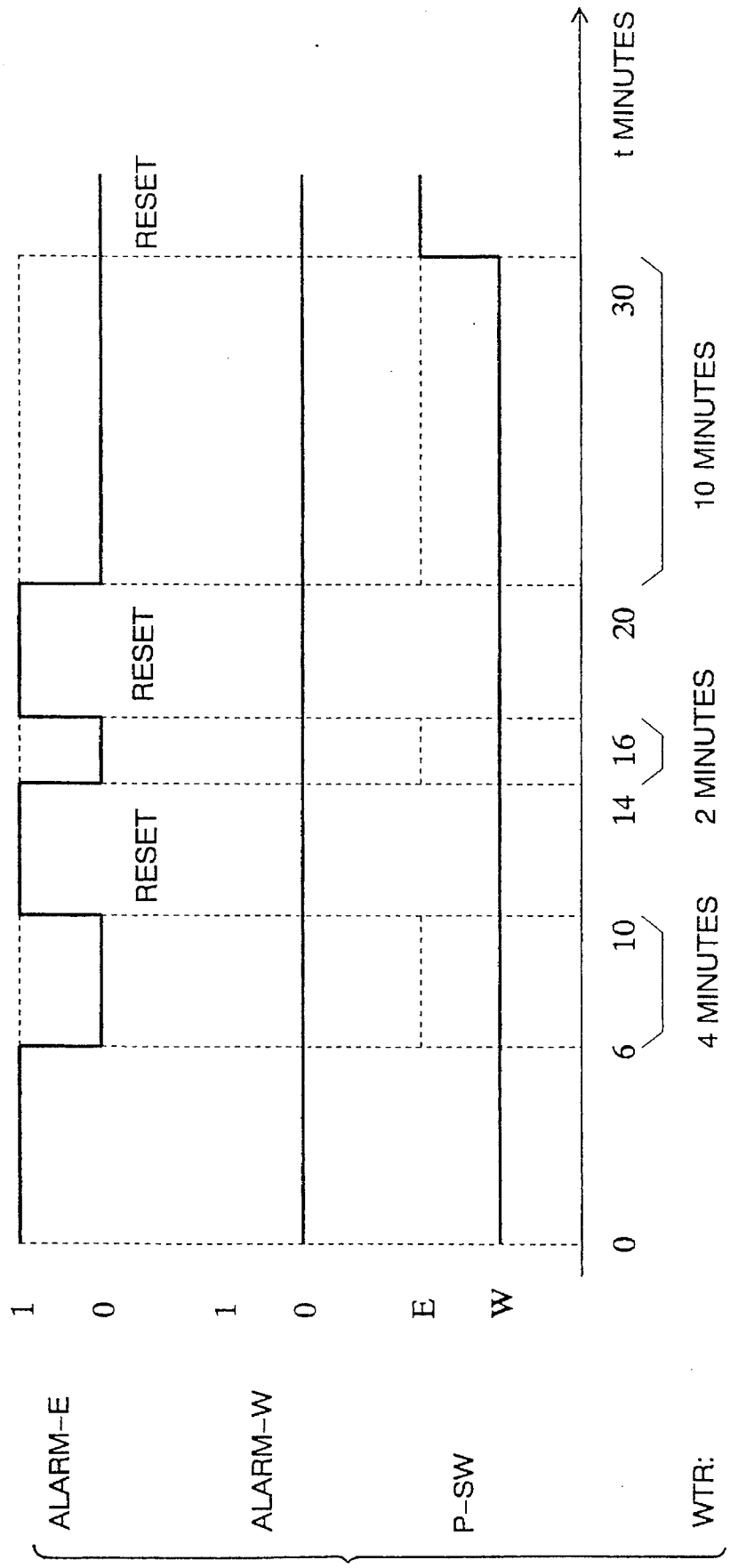
FIG. 2 is a time chart for explaining the operation of path switches.
Figure 3:
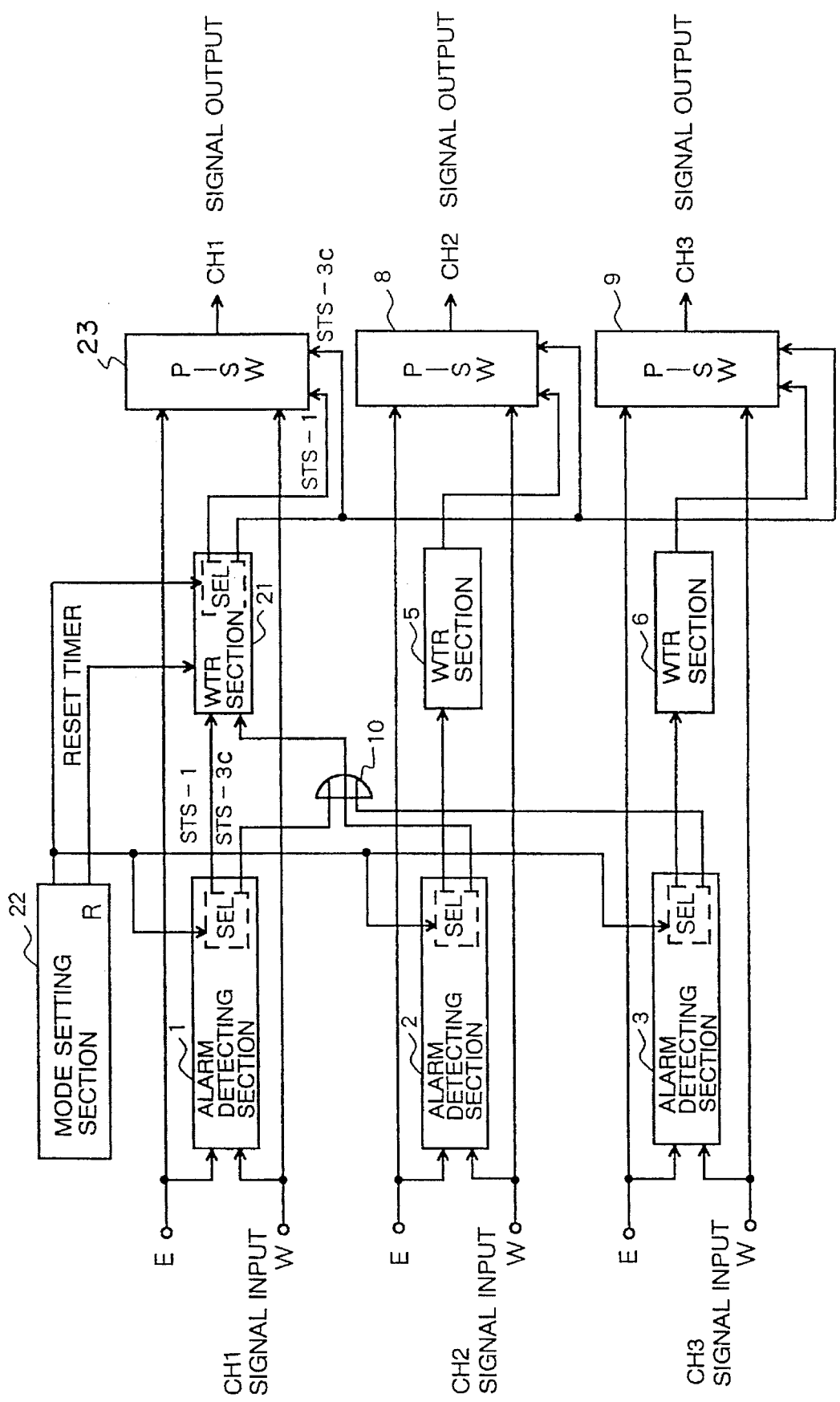
FIG. 3 is a block diagram showing the principle structure of an optical transmission system according to a first embodiment of the present invention.

FIG. 3 illustrates the principle structure of an optical transmission system according to a first embodiment of the present invention; like or same reference numerals as used in FIG. 1 are given to corresponding or identical components in FIG. 3.

An optical transmission system shown in FIG. 3 effectively shares a wait-to-restore (WTR) section in both the STS-1 mode and STS-3c mode to reduce the circuit scale. The optical transmission system in FIG. 3 effectively shares a WTR section 21 corresponding to CH1 in STS-1 mode is shared in both the STS-1 mode and STS-3c mode. Accordingly, a mode setting section 22 and a path switch 23 slightly differ from those in FIG. 1.

The WTR section 21 has a selector SEL for switching an output side under the control of the mode setting section 22, and is designed in such a way that a timer is reset at the time the mode is changed. More specifically, the selector SEL of the WTR section 21 supplies the output only to the path switch 23 in STS-1 mode, and supplies the output commonly to path switches 23, 8 and 9 in STS-3c mode.

The mode setting section 22 supplies a selector switch signal to alarm detecting sections 1, 2 and 3 and supplies a select switch signal for the selector SEL and a timer reset signal to the WTR section 21.

This optical transmission system differs from the conventional system in FIG. 1 in STS-1 and STS-3c modes in that the output of the WTR section 21 is supplied only to the path switch 23 in STS-1 mode while this output is supplied to all the path switches 23, 8 and 9 in STS-3c mode. This is because that it is necessary to control the interlocked action of the path switches 23, 8 and 9 in STS-3c mode.

In this case, at the time of changing the STS-1 mode to the STS-3c mode or changing the STS-3c mode to the STS-1 mode, the wait-to-restore (WTR) time in the previous mode remains in the timer of the WTR section 21. To prevent a time after the mode change from being added to the remaining time, therefore, the timer of the WTR section 21 should be reset. In STS-3c mode, the timers of the WTR sections 5 and 6 for the exclusive use for the STS-1 mode are reset.

Since the structure in FIG. 3, unlike that of the conventional system, shares the WTR section 21 in both the STS-1 mode and STS-3c mode, no exclusive WTR sections for the STS-3c mode are required but the selector SEL in the WTR section 21 and the timer reset output R of the mode setting section 22 are added, The circuit scale for the added components is considerably smaller than the circuit scale that is omitted.

Since the optical transmission system in FIG. 3 effectively shares the WTR section 21 in both STS-1 and STS-3c modes, the output of the WTR section 21 is supplied only to the path switch 23 in the STS-1 mode and is supplied to all the path switches 23, 8 and 9 in the STS-3c mode. In other words, as the WTR section 21 is shared effectively in the STS-1 mode and STS-3c mode, the circuit scale can effectively be reduced without the sacrifice of its functions to contribute to the systemization of the circuit structure.

In the optical transmission system of this invention, at least one of the P-SW counter section and alarm display section may be effectively shared in the STS-1 mode and STS-3c mode.

In this case, the P-SW counter section shared in the STS-1 mode and STS-3c mode counts the count value of the associated path switch (e.g., for CH1) regardless of the mode.

The alarm display section shared in the STS-1 mode and STS-3c mode displays an alarm based on the detection result of the associated alarm detecting section in STS-1 mode and displays an alarm based on the OR gate, which performs an OR operation on the outputs of all the alarm detecting sections, in STS-3c mode.

In those cases, at the time of changing the STS-1 mode to the STS-3c mode or changing the STS-3c mode to the STS-1 mode, the count value of the path switch or the alarm display value in the previous mode remains in the shared P-SW counter section or the shared alarm display section. To prevent a value in the new mode from being added to the remaining value, therefore, the counter of the P-SW counter section or the display value of the alarm display section are reset. In STS-3c mode, the counters of the exclusive P-SW counter sections for the STS-1 mode or the display values of the exclusive alarm display sections for the STS-1 mode are reset.

A description will now be given of an optical transmission system embodying this invention, which is designed in such a manner that a P-SW counter section and alarm display section in addition to the WTR section are shared in both STS-1 and STS-3c modes.

Second Embodiment

Figure 4:
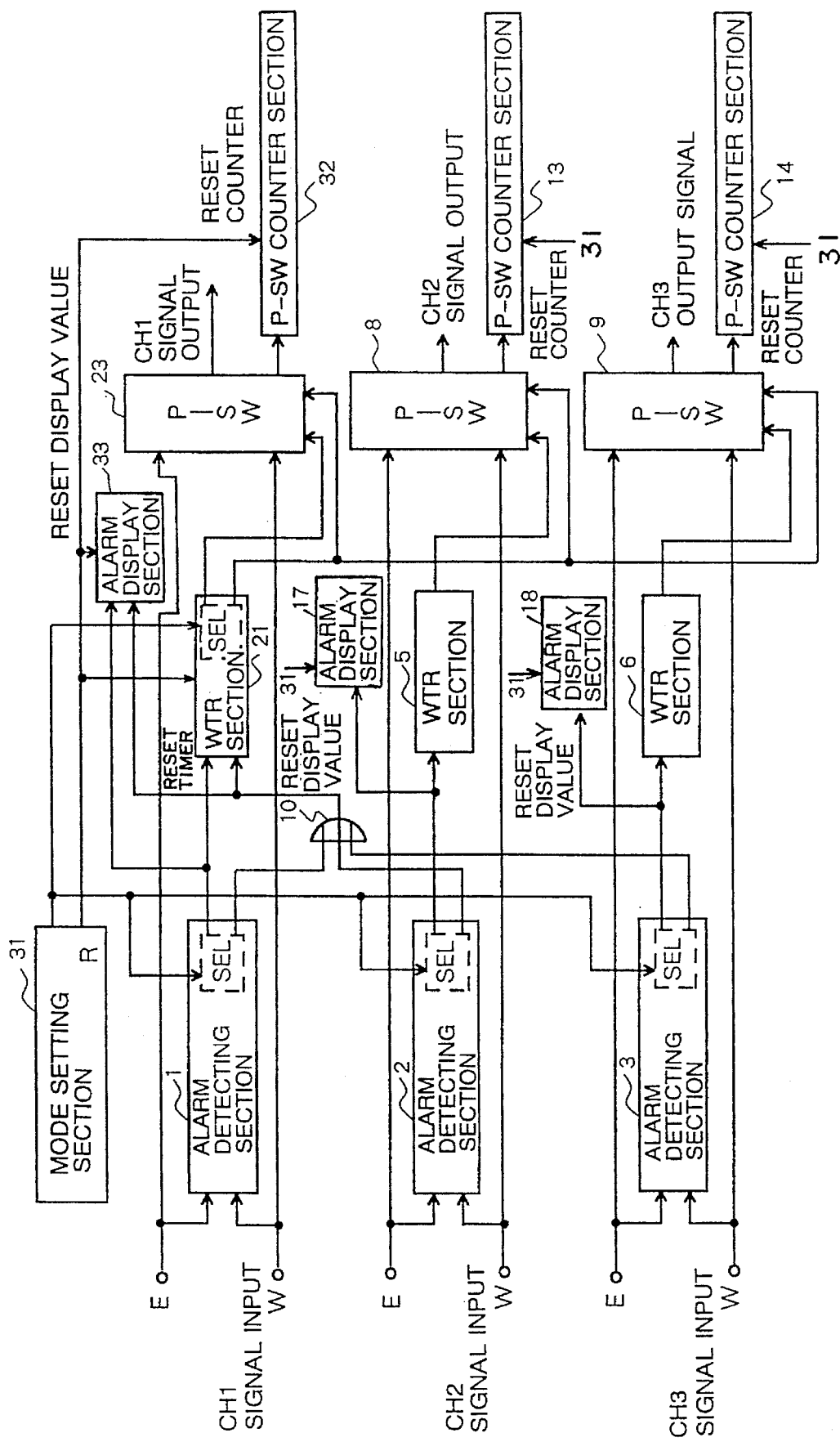
FIG. 4 is a block diagram showing the structure of an optical transmission system according to a second embodiment of this invention.

FIG. 4 illustrates the structure of the essential portions of an optical transmission system according to a second embodiment of this invention. Like or same reference numerals as used in FIG. 3 are given to corresponding or identical components in FIG. 4 to avoid repeating their descriptions.

The optical transmission system in FIG. 4 shares a WTR section, P-SW counter section and alarm display section in STS-1 and STS-3c modes. This optical transmission system comprises P-SW counter sections 13 and 14 and alarm display sections 17 and 18, similar to those in FIG. 1, in addition to alarm detecting sections 1, 2 and 3, WTR sections 5, 6 and 21, path switches 8, 9 and 23 and an OR gate 10, similar to those in FIG. 3. The optical transmission system further comprises a mode setting section 31, a P-SW counter section 32 and an alarm display section 33.

The P-SW counter section 32 is designed in such a manner that it always counts the number of switching actions of the path switch 23 and the count value of its counter is reset at the time the mode is changed by the mode setting section 31. That is, the P-SW counter section 32 counts the output of the path switch 23 in STS-1 mode as well as in STS-3c mode. In this respect, the path switch 23 is not equipped with a selector for switching the counter.

The alarm display section 33 is designed in such a way that it displays an alarm based on the detection output of the alarm detecting section 1 and the output of the OR gate 10 and the display value is reset at the time the mode is changed by the mode setting section 31. In other words, the alarm display section 33 performs an alarm display based on the output from the selector SEL of the alarm detecting section 1 in STS-1 mode and performs an alarm display based on the output of the OR gate in STS-3c mode.

The mode setting section 31 supplies a selector (SEL) change signal to the alarm detecting sections 1, 2 and 3 and a selector (SEL) change signal and a timer reset signal to the WTR section 21, and supplies a counter reset signal to the P-SW counter sections 32, 13 and 14 and a display value reset signal to the alarm display sections 33, 17 and 18.

In the structure in FIG. 4, the WTR section 21, P-SW counter section 32 and alarm display section 33 are shared in both STS-1 and STS-3c modes.

The operations in the STS-1 mode and STS-3c mode in this embodiment differ from those of the structure shown in FIG. 1 in the following points.

The output of the WTR section 21 is given only to the path switch 23 in STS-1 mode and is given to all the path switches 23, 8 and 9 in STS-3c mode. This is because some control is needed to interlock the actions of the path switches 23, 8 and 9 in STS-3c mode.

The P-SW counter section 32 counts the count value of the path switch 23 regardless of the mode, i.e., in both STS-1 and STS-3c modes.

Likewise, the alarm display section 33 displays an alarm regardless of the mode.

If the wait time for the WTR operation, the count value of the path switching and the contents of the alarm display in the previous mode respectively remain in the WTR section 21, P-SW counter sections 32, 13 and 14, and alarm display sections 33, 17 and 18 at the time of the mode change from the STS-1 mode to the STS-3c mode or vice versa, the processing contents after the mode change are adversely affected by the processing contents before the mode change. In this case, therefore, the timer of the WTR section 21, the counters of the P-SW counter sections 32, 13 and 14 and the displays of the alarm display sections 33, 17 and 18 are reset.

In STS-3c mode, the timers of the WTR sections 5 and 6, the counters of the P-SW counter sections 13 and 14 and the display values of the alarm display sections 17 and 18, all provided exclusively for the STS-1 mode, are reset.

In other words, those portions which are not used in the selected mode are reset.

Figures 5, 6:
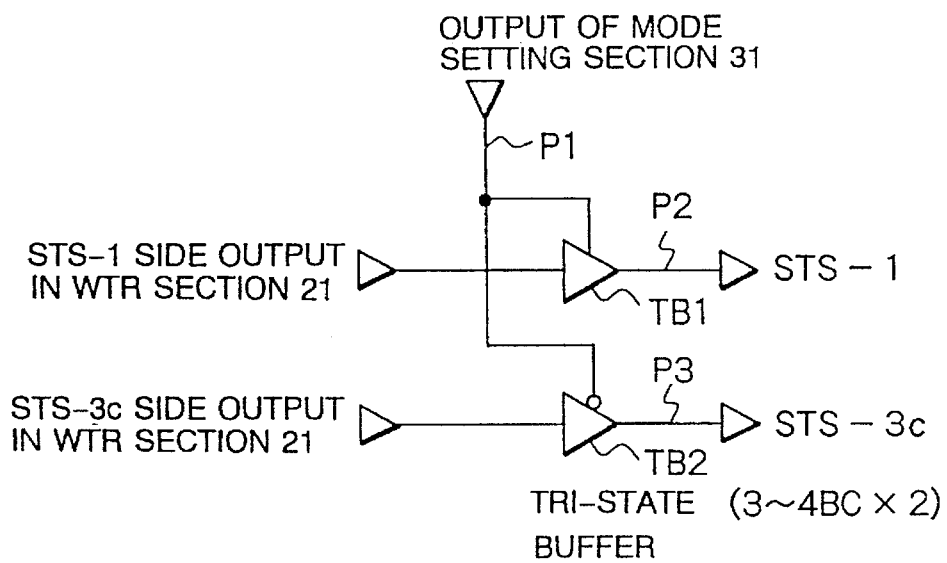
FIG. 5 is a diagram for comparing the reset control by the system in FIG. 4 with that of the conventional system.
FIG. 6 is a diagram for explaining the structure of selectors in the system in FIG. 4.

FIG. 5 shows the contents of the reset control. In FIG. 5, "○" indicates what is available, "R" indicates resetting, and "—" indicates unused or uncontrolled sections. The upper left of each slant line in the diagram shows the conventional case, and the lower right of the slant line shows the case of this embodiment.

While the portions corresponding to the WTR section 20, P-SW counter section 15 and alarm display section 19 in FIG. 1 which are exclusively provided for the STS-3c mode are omitted from the structure shown in FIG. 4, the selector SEL in the WTR section 21 and the reset control system of the mode setting section 31 are substantially added. The scale of the added circuits is however considerably smaller than the scale of the omitted circuits.

For example, the circuit scale of the FLM 150/600/2400 ADM type optical transmission system with the conventional structure includes about 210 BCs (BC: basic cell) in the WTR section 20, about 530 BCs in the P-SW counter section 15 and about 1000 BCs in the alarm display section 19, whereas the selector SEL in the WTR section 21 can be accomplished by about 10 BCs and the reset control system of the mode setting section 31 can be accomplished by about 20 BCs.

FIG. 6 presents a block diagram showing a specific example of a selector circuit which constitutes the selector SEL, and Table 2 below is given for explaining the operation of the selector circuit.

With the mode setting output of an "H" level from the mode setting section 31 specifying the STS-1 mode and the mode setting output of an "L" level specifying the STS-3c mode, the selector circuit in FIG. 6 can control the switching of the output of the WTR section 21 in accordance with the selected mode, though having a simple structure of a combination of tri-state buffers TB1 and TB2.

TABLE 2

| Section | Signal Contents | Signal Contents |
| --- | --- | --- |
| P1 | "H" | "L" |
| P2 | output | high impedance |
| P3 | high impedance | output |

Table 2 shows the individual sections P1, P2 and P3 in FIG. 6. In STS-1 mode, the output P1 of the mode setting section 31 has an "H" level, and a signal is output as the output P2 of the tri-state buffer TB1 while the output P3 of the tri-state buffer TB2 becomes a high impedance state. In STS-3c mode, the output P1 of the mode setting section 31 has an "L" level, and the signal output P2 of the tri-state buffer TB1 becomes a high impedance state while a signal is output as the output P3 of the tri-state buffer TB2.

FIG. 7 exemplifies a reset signal generator and FIG. 8 shows a timing chart for explaining the operation of the reset signal generator.

The reset signal generator in FIG. 7 comprises cascade-connected flip-flops F/F1 and F/F2 and an exclusive OR gate EOR which obtains an exclusive OR operation on the outputs of the flip-flops F/F1 and F/F2. FIG. 8 shows the signal waveforms at individual points P11 to P15 in FIG. 7.

In the reset signal generator in FIG. 7, the flipflops F/F1 and F/F2 are driven by a reference clock CLK of 8 MHz given at the point P11 from outside and the outputs of those flip-flops F/F1 and F/F2 at the points P13 and P14 are supplied to the exclusive OR gate EOR, producing a reset signal at the point P15. In other words, the reset signal is produced at the point P15 within one period (125 ns (125× $10^{-9}$s) of the 8-MHz clock CLK in accordance with a change in the mode setting signal in the mode setting section 31 at the point P12. As one STS-1 frame is produced at the timing of 125 μs (125×$10^{-6}$s) or the timing of 8 KHz as will be discussed later, the time required to generate this reset signal is sufficiently lower than the time for generating one STS-1 frame.

The optical transmission system in FIG. 4 effectively shares the P-SW counter section and alarm display section as well as the WTR section in the STS-1 and STS-3c modes, the circuit scale can be reduced more effectively without the sacrifice of its functions to systemize the circuit structure.

Third Embodiment

Figure 9:
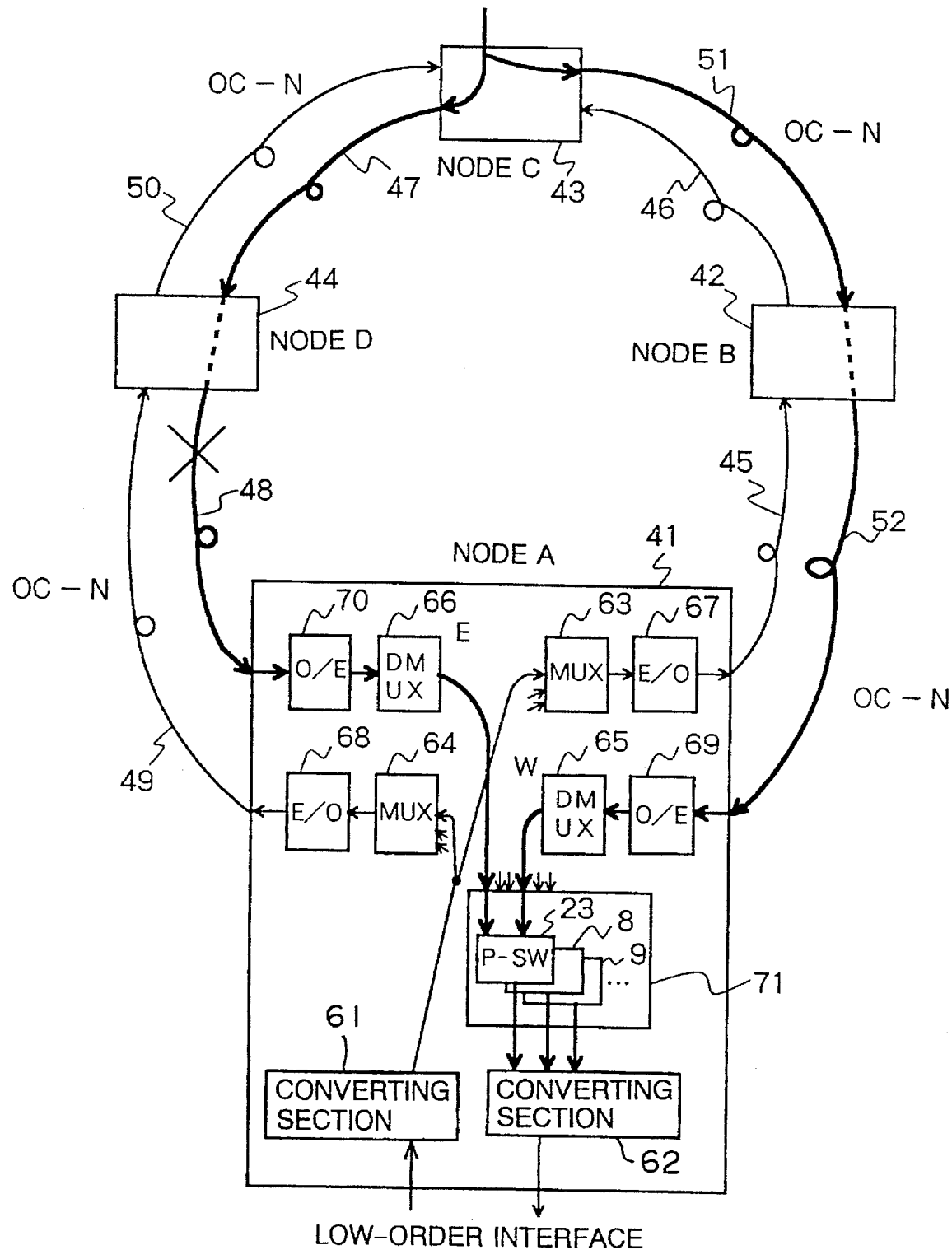
FIG. 9 is a block diagram showing the structure of a ring network in an optical transmission system according to a third embodiment of this invention.

FIG. 9 shows the structure of a ring network system according to a third embodiment of this invention which is built up by using the optical transmission system in FIG. 4 at each node in a ring network.

The ring network system shown in FIG. 9 comprises a node A41, a node B42, a node C43 and a node D44, which are connected in a ring form by optical transmission paths 45, 46, 47, 48, 49, 50, 51 and 52. The nodes A41, B42, C43 and D44 are each constituted as the aforementioned FLM 150/600/2400 ADM equipment, and have the same internal structure. Therefore, the internal structure of only the node A41 is illustrated in FIG. 9 and the illustration of those of the other nodes B42, C43 and D44 is omitted.

The node A41 comprises signal converting sections 61 and 62, multiplexing sections (hereinafter called "MUX sections") 63 and. 64, demultiplexing section (hereinafter called "DMUX sections") 65 and 66, electronic/optic (E/O) converting sections 67 and 68, optic/electronic (O/E) converting sections 69 and 70, and a path switch section 71.

The signal converting section 61 converts a signal on the low-order interface side to an STS-1 signal. The signal converting section 62 converts a signal selected by the path switch section 71 to a signal on the loworder interface side.

The MUX sections 63 and 64 multiplex STS-1 signals. The DMUX sections 65 and 66 demultiplex the multiplexed signal into STS-1 signals.

The E/O converting sections 67 and 68 convert an electric signal to an optical signal. The 0/E converting sections 69 and 70 convert an optical signal to an electric signal.

The path switch section 71 includes the same structure as shown in FIG. 4. More specifically, path switches 23, 8 and 9 for selectively switching paths for the same signal from the E (eastward) direction and W (westward) direction (in this case, the clockwise output side or the counterclockwise input side in the ring structure, and the counterclockwise output side or the clockwise input side are respectively treated as the E direction and W direction) are provided together with the individual peripheral portions shown in FIG. 4.

With the ring structure having the nodes A41, B42, C43 and D44 connected together, the inputting of a signal from the low-order interface side is called "add," the outputting of a signal to the low-order interface side is called "drop" and this "add/drop" is executed at the nodes A41, B42, C43 and D44 to constitute an ADM (Add-Drop Multiplex) equipment. The signals currently available for the low-order interface include a DS-1 signal having a transfer rate of 1,544 Mb/s, a DS-3 signal having a transfer rate of 44.736 Mb/s, STS-1 electric signals having a transfer rate of 51.84 Mb/s, and an OC-N optical signal having a transfer rate N (N=1, 3, 9, 12, 18, 24, 36, 48) times the transfer rate of an OC-1 signal which is obtained by converting an STS-1 signal having a transfer rate of 51.84 Mb/s into an optical signal.

At the node A41, for example, some of those signals are converted in the units of STS-1 by the converting section 61, the STS-1 signals are multiplexed by the MUX sections 63 and 64, the resultant electric signals are converted to optical signals by the E/O converting sections 67 and 68, and the OC-N optical signals are sent to the W path and the E path.

When OC-N optical signals are received from the W path and E path, on the other hand, the optical signals are converted to electric signals by the O/E converting sections 69 and 70, are demultiplexed to STS-1 signals by the DMUX sections 65 and 66, and the W path signal and E path signal are selected by the individual path switches 23, 8 and 9 in the path switch section 71 which has the same structure as is shown in FIG. 4.

The signals selected by the path switches 23, 8 and 9 in the path switch section 71 are converted by the converting section 62 to have the bit rate that conforms to the specification of the low-order interface.

In executing communication from the node C43 to the node A41, for example, in the above sequence of operations, signals path through two paths indicated by thick solid lines in FIG. 9, namely, the path from "the node C43, to the optical transmission path 47, (to the node D44), to the optical transmission path 48, to the O/E converting section 70 and then to the DMUX section 66"and the path from "the node C43, to the optical transmission path 51, (to the node B42), to the optical transmission path 52, to the O/E converting section 69 and then to the DMUX section 65" and are dropped by the path switches 23, 8 and 9 in the path switch section 71. In this case, if the optical transmission path 48 fails for some reasons when the E path side is selected by the path switches 23, 8 and 9 in the path switch section 71 and this optical transmission path 48 is disconnected, the signals on the E path side are blocked so that the path switches 23, 8 and 9 in the path switch section 7 are switched to the W path side.

The disconnection is detected by the alarm detecting sections 1, 2 and 3 shown in FIG. 4, after which the path switches 23, 8 and 9 are switched to the W path side via the WTR sections 21, 5 and 6, respectively.

Figure 10:
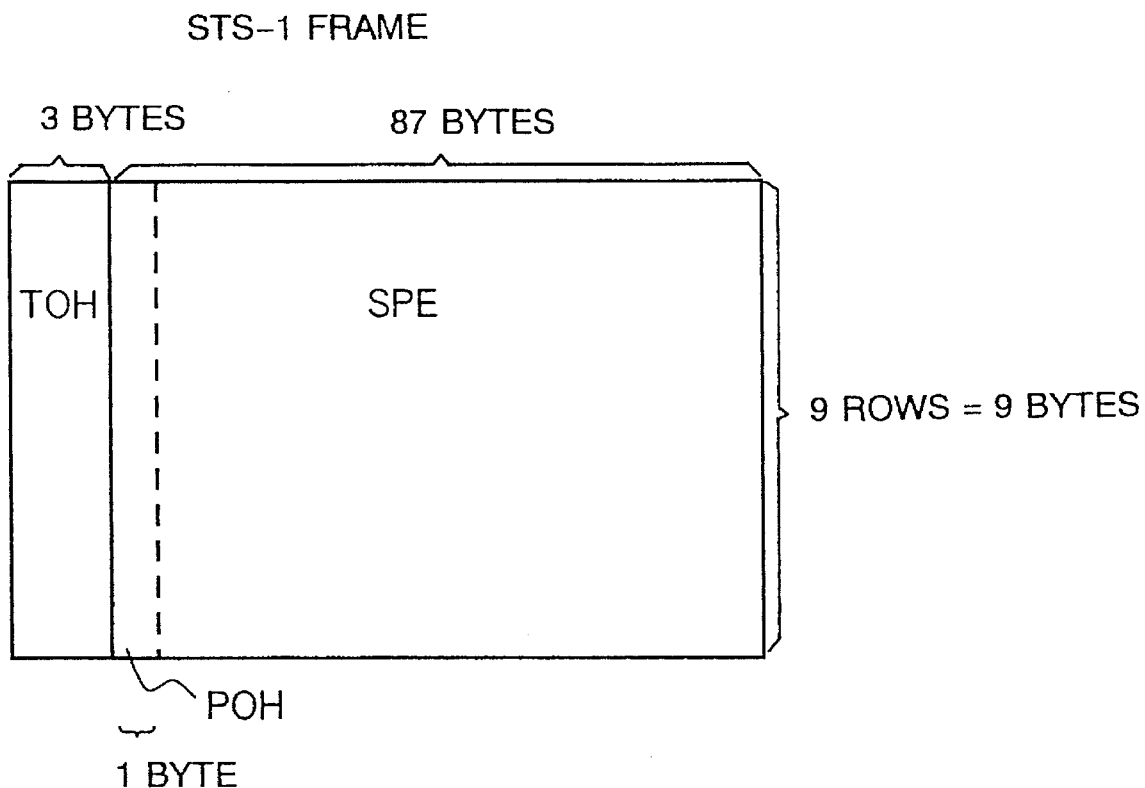
FIG. 10 is a diagram for explaining the structure of an STS-1 frame of SONET.
Figure 11:
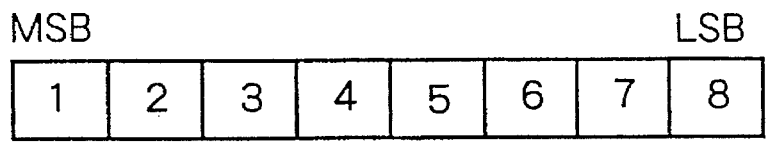
FIG. 11 is a diagram for explaining the bit structure of each byte constituting the STS-1 frame of SONET.

FIGS. 10 and 11 show one example of the frame structure of signals that are handled by SONET. This frame is called "STS-1 frame" which is transferred at a rate of 51.84 Mb/s, and the transfer time for one frame is 125 μs (i.e., 8000 frames/sec).

As shown in FIG. 10, one STS-1 frame consists of nine rows each of 90 bytes, a total of 810 bytes. The leftmost part in the diagram of 3 bytes×9 rows is assigned as a TOH (Transport Overhead) which is for the control usage, and the rightmost part in the diagram of 87 bytes×9 rows is assigned as an SPE (Synchronous Payload Envelope) which is for data.

The leftmost one column in the SPE is a POH (Path Overhead) for path control which consists of one byte×9 rows=9 bytes. Although this POH can be set at any location in the SPE, it is set at the leftmost end in the SPE in this embodiment.

FIG. 11 shows the bit structure of each byte that constitutes the STS-1 frame. Each byte consists of 8 bits from the MSB (Most Significant Bit) to the LSB (Least Significant Bit).

The transfer of such an STS-1 frame is carried out rightward from the upper left end in FIG. 10 till the right end of the first row, and continues in the same manner for the second row, third row and so forth, and is completed at the rightmost end of the ninth row. The bits in each byte are transferred in the order from the MSB to the LSB.

Figure 12:
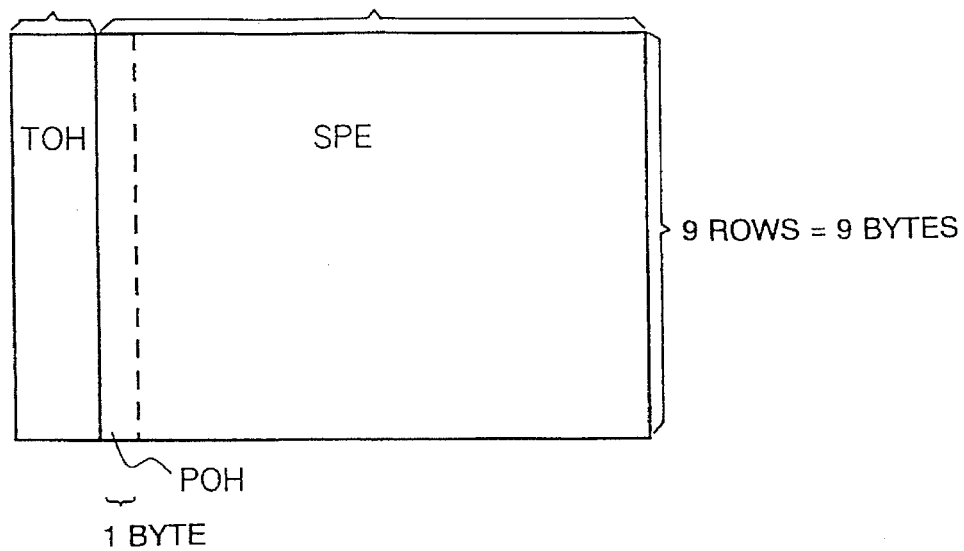
FIG. 12 is a diagram for explaining the structure of an STS-3c frame of SONET.
Figure 13:
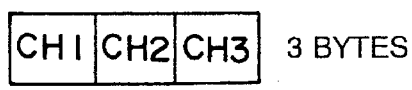
FIG. 13 is a diagram for depicting the structure of the STS-3c frame of SONET in detail.
Figure 14:
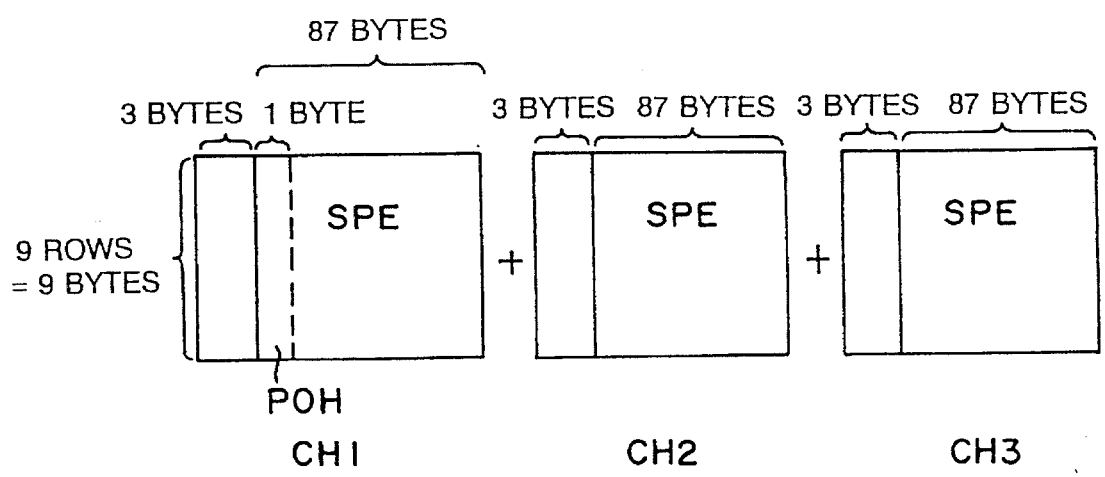
FIG. 14 is a diagram for exemplarily depicting the structure of the STS-3c frame of SONET.

FIGS. 12 through 14 shows the structure of an STS-3c frame, which is another example of the signals handled by SONET. Since the STS-3c frame is transferred at a rate of 155.52 Mb/s and the transfer time for one frame is 125 μs, the transfer speed for the STS-3c frame is three times faster than that for the STS-1 frame.

As shown in FIG. 12, the STS-3c frame consists of 270 bytes×9 rows, a total of 2430 bytes. The TOH consists of 81 (3×3×9) bytes and SPE consists of 2349 (3×87×9) bytes, both of which are three times the sizes for the STS-1 frame. Only the size of the POH, which is 9 (1 byte×9) bytes, is the same as that of the STS-1 frame. The bit structure of each byte is the same as that of the STS-1 frame, and the TOH and SPE each consist of units of 3 bytes arranged in order for CH1, CH2 and CH3, one byte for each channel, as shown in FIG. 13. The STS-3c frame corresponds to information of three channels of STS-1 frames as shown in FIG. 14.

The STS-3c frame, like the STS-1 frame, is transferred rightward from the upper left end till the right end of the first row, and continues in the same manner for the remaining rows until the lower rightmost end.

The STS-3c frame will be discussed with reference to FIG. 9.

When an OC-3 optical signal constituting an STS-3c frame is input to the node A41 from the optical transmission path 52, for example, in FIG. 9, the signal is converted to an electric signal by the O/O converting section 69 and the resultant signal is then demultiplexed to be separated channel by channel. The signals in FIG. 14 are input to the path switches 23, 8 and 9 in the path switch section 71, respectively. This, if applied to the case of FIG. 4, means that the individual signals of CH1, CH2 and CH3 shown in FIG. 14 are input to CH1, CH2 and CH# in FIG. 4. As the signals of those CH1, CH2 and CH3 are one STS-3c frame timedivided by three, if an alarm is generated in any of the signals of CH1, CH2 and CH3, the path switches 23, 8 and 9 should be operated in an interlocked manner.

Although the optical transmission system shown in FIG. 4 shares the WTR section, P-SW counter section and alarm display section in both STS-1 and STS-3c modes, the WTR section and P-SW counter section alone may be shared in the STS-1 and STS-3c modes. In this case, the alarm display section should have the same structure as shown in FIG. 1.

Alternatively, only the WTR section and alarm display section may be shared in both STS-1 and STS-3c modes, in which case the P-SW counter section should have the same structure as shown in FIG. 1.

Further, the WTR section alone may be shared in both STS-1 and STS-3c modes, in which case the P-SW counter section and alarm display section should have the same structures as shown in FIG. 1.

Furthermore, the number of nodes constituting a ring network is not limited to four nodes shown in FIG. 9, but any number of nodes may be selected.

What is claimed is:

1. An optical transmission system comprising:

a mode setting section for selectively setting an STS-1 mode for a pass process of STS-1 units for a basic frame format in a SONET system and an STS-3c mode for a pass process of STS-3C units for a frame format requiring a large transfer capacity, each STS-3c unit being obtained by coupling first to third channels of STS-1;

first to third alarm detecting sections for respectively detecting alarms in signals of individual channels in two directions and outputting alarm detecting signals;

first to third wait-to-restore sections for outputting a switching signal when no alarm detecting signal is received from said first to third alarm detecting sections for a predetermined interval;

first to third path switches for switching paths of corresponding channels in two directions when receiving said switching signal to output said signal received from a switched path; and means for supplying said alarm detecting signals outputted from said first to third alarm detecting sections to said first to third wait-to-restore sections, respectively, in said STS-1 mode and supplying all the alarm detecting signals outputted from said first to third alarm detecting section only to a first wait-to-restore section in said STS-3c mode.

2. An optical transmission system comprising:

a mode setting section for selectively setting an STS-1 mode for a pass process of STS-1 units for a basic frame format in a SONET system and an STS-3c mode for a pass process of STS-3c units for a frame format requiring a large transfer capacity, each STS-3c unit being obtained by coupling first to third channels of STS-1;

first to third alarm detecting sections for respectively detecting alarms in signals of individual channels in two directions and outputting alarm detecting signals;

first to third wait-to-restore sections for outputting a switching signal when no alarm detecting signal is received for a predetermined interval;

first to third path switches for switching paths of corresponding channels in two directions when receiving said switching signal to output said signal received from a switched path;

first to third path switch counter sections for respectively counting numbers of switching actions of said first to third path switches;

means for supplying said alarm detecting signals outputted from said first to third alarm detecting sections to said first to third wait-to-restore sections, respectively, in said STS-1 mode and supplying all the alarm detecting signals outputted from said first to third alarm detecting section only to said first wait-to-restore section in said STS-3c mode; and means for resetting count values of said first to third path switch counter sections at a time of a mode change between said STS-1 mode and said STS-3c mode.

3. An optical transmission system comprising:

a mode setting section for selectively setting an STS-1 mode for a pass process of STS-1 units for a basic frame format in a SONET system and an STS-3c mode for a pass process of STS-3c units for a frame format requiring a large transfer capacity, each STS-3c unit being obtained by coupling first to third channels of STS-1;

first to third alarm detecting sections for respectively detecting alarms in signals of individual channels in two directions to output alarm detecting signals;

first to third wait-to-restore sections for outputting a switching signal when no alarm detecting signal is received for a predetermined interval;

first to third path switches for switching paths of corresponding channels in two directions when receiving said switching signal to output said signal received from a switched path;

first to third alarm display sections for displaying alarm states when receiving the alarm detecting signals;

means for supplying said alarm detecting signals outputted from said first to third alarm detecting sections to said first to third wait-to-restore sections and said first to third alarm display sections, respectively, in said STS-1 mode and supplying all the alarm detecting signals outputted from said first to third alarm detecting sections only to said first wait-to-restore section and said first alarm display section in said STS-3c mode; and means for resetting display values of said first to third display sections at a time of a mode change between said STS-1 mode and said STS-3c mode.

4. The optical transmission system according to claim 3, further comprising first to third path switch counter sections for respectively counting numbers of switching actions of said first to third path switches, and wherein said mode setting section includes means for resetting count values of said first to third path switch counter sections at a time of a mode change between said STS-1 mode and said STS-3c mode.

5. A ring network system conforming to a SONET system having network elements, each network element comprising:

a mode setting section for selectively setting an STS-1 mode for a pass process of STS-1 units for a basic frame format in a SONET system and an STS-3c mode for a pass process of STS-3c units for a frame format requiring a large transfer capacity, each STS-3c unit being obtained by coupling first to third channels of STS-1;

first to third alarm detecting sections for respectively detecting alarms in signals of individual channels in two directions to output alarm detecting signals;

first to third wait-to-restore sections for outputting a switching signal when no alarm detecting signal is received for a predetermined interval;

first to third path switches for switching paths of corresponding channels in two directions when receiving said switching signal to output said signal received from a switched path; and means for supplying said alarm detecting signals outputted from said first to third alarm detecting sections to said first to third wait-to-restore sections, respectively, in said STS-1 mode and supplying all the alarm detecting signals outputted from said first to third alarm detecting sections only to said first wait-to-restore section in said STS-3c mode.

6. A ring network system conforming to a SONET system having network elements, each network element comprising:

a mode setting section for selectively setting an STS-1 mode for a pass process of STS-1 units for a basic frame format in a SONET system and an STS-3c mode for a pass process of STS-3c units for a frame format requiring a large transfer capacity, each STS-3c unit being obtained by coupling first to third channels of STS-1;

first to third alarm detecting sections for respectively detecting alarms in signals of individual channels in two directions to output alarm detecting signals;

first to third wait-to-restore sections for outputting a switching signal when no alarm detecting signal is received for a predetermined interval;

first to third path switches for switching paths of corresponding channels in two directions when receiving said switching signal to output said signal received from a switched path;

first to third path switch counter sections for respectively counting numbers of switching actions of said first to third path switches;

means for supplying said alarm detecting signals outputted from said first to third alarm detecting sections to said first to third wait-to-restore sections, respectively, in said STS-1 mode and supplying all the alarm detecting signals outputted from said first to third alarm detecting sections only to said first wait-to-restore section in said STS-3c mode; and means for resetting count values of said first to third path switch counter sections at a time of a mode change between said STS-1 mode and said STS-3c mode.

7. A ring network system conforming to a SONET system having network elements, each network element comprising:

a mode setting section for selectively setting an STS-1 mode for a pass process of STS-1 units for a basic frame format in a SONET system and an STS-3c mode for a pass process of STS-3c units for a frame format requiring a large transfer capacity, each STS-3c unit being obtained by coupling first to third channels of STS-1;

first to third alarm detecting sections for respectively detecting alarms in signals of individual channels in two directions to output alarm detecting signals;

first to third wait-to-restore sections for outputting a switching signal when no alarm detecting signal is received for a predetermined interval;

first to third path switches for switching paths of corresponding channels in two directions when receiving said switching signal to output said signal received from a switched path;

first to third alarm display sections for displaying alarm states when receiving the alarm detecting signals;

means for supplying said alarm detecting signals outputted from said first to third alarm detecting sections to said first to third wait-to-restore sections and said first to third alarm display sections, respectively, in said STS-1 mode and supplying all the alarm detecting signals outputted from said first to third alarm detecting sections only to said first wait-to-restore section and said first alarm display section in said STS-3c mode; and means for resetting display values of said first to display sections at a time of a mode change between said STS-1 mode and said STS-3c mode.

8. The ring network system according to claim 7, further comprising first to third path switch counter sections for respectively counting numbers of switching actions of said first to third path switches, and wherein said mode setting section includes means for resetting count values of said first to third path switch counter sections at a time of a mode change between said STS-1 mode and said STS-3c mode.

9. A transmission apparatus for a SONET system having first to third channels each of which receives a signal of a frame of an STS-1 unit and a signal of a divided frame of an STS-3C unit in two directions, the apparatus comprising:

a mode setting section for selectively setting an STS-1 mode for a pass process of the STS-1 unit and an STS-3c mode for a pass process of the STS-3C units;

first to third alarm detecting sections provided correspondingly with said first to third channels, respectively, for respectively detecting alarms in signals of individual channels in two directions to output alarm detecting signals;

first to third wait sections, provided correspondingly with said first to third alarm detecting sections, respectively, for outputting switching signals when no alarm detecting signal is received for a predetermined interval;

first to third path switches, provided correspondingly with said first to third wait sections, respectively, for switching paths of corresponding channels between said two directions when receiving a switching signal to output said signal received from switched paths;

means for supplying said alarm detecting signals outputted from said first to third alarm detecting sections to a corresponding wait section in said STS-1 mode and supplying all the alarm detecting signals outputted from said first to third alarm detecting sections only to a first wait section in said STS-3c mode; and means for supplying said switching signals outputted from said first to third wait sections to a corresponding path switch in said STS-1 mode and supplying only a switching signal outputted from said first wait section to all path switches in said STS-3C mode.

* * * * *